United States Patent
Withrow et al.

(10) Patent No.: US 7,296,562 B2
(45) Date of Patent: Nov. 20, 2007

(54) CONTROL SYSTEM AND METHOD FOR ESTIMATING TURBOCHARGER PERFORMANCE

(75) Inventors: Michael P. Withrow, Peoria, IL (US); Kevin L. Dea, Washington, IL (US); Christopher R. Gehrke, Chillicothe, IL (US); Michael R. Donoho, II, Edelstein, IL (US)

(73) Assignee: Caterpiller Inc., Peoria, IL (US)

( * ) Notice: Subject to any disclaimer, the term of this patent is extended or adjusted under 35 U.S.C. 154(b) by 91 days.

(21) Appl. No.: 11/392,571

(22) Filed: Mar. 30, 2006

(65) Prior Publication Data
US 2007/0227139 A1 Oct. 4, 2007

(51) Int. Cl.
*F02B 33/00* (2006.01)
(52) U.S. Cl. ............... 123/559.1; 60/600; 60/605.1; 60/605.2; 60/611; 60/614; 60/615; 60/624; 60/273; 123/568.11; 123/568.22; 123/672; 123/676; 123/677; 123/678; 123/687
(58) Field of Classification Search ............ 60/600, 60/605.1, 605.2, 611, 614, 615, 624, 273; 123/568.11, 568.22, 672, 676, 677, 678, 687
See application file for complete search history.

(56) References Cited

U.S. PATENT DOCUMENTS

| | | | |
|---|---|---|---|
| 5,829,254 A | 11/1998 | Hayashi et al. | |
| 6,035,639 A | 3/2000 | Kolmanovsky et al. | |
| 6,035,640 A * | 3/2000 | Kolmanovsky et al. | .... 60/605.2 |
| 6,050,093 A | 4/2000 | Daudel et al. | |
| 6,076,353 A * | 6/2000 | Freudenberg et al. | ...... 60/605.2 |
| 6,401,457 B1 | 6/2002 | Wang et al. | |
| 6,480,782 B2 | 11/2002 | Brackney et al. | |
| 6,539,714 B1 | 4/2003 | Wang | |

(Continued)

FOREIGN PATENT DOCUMENTS

EP 0 685 638 12/1995

(Continued)

OTHER PUBLICATIONS

PCT International Search Report; PCT/US2007/003633; International Filing Date: Feb. 9, 2007; Priority Date: Mar. 30, 2006; Applicant: Caterpillar Inc.; Applicant's Ref. No. 05-537.

*Primary Examiner*—Thomas Denion
*Assistant Examiner*—Douglas J. Duff
(74) *Attorney, Agent, or Firm*—Finnegan, Henderson, Farabow, Garrett & Dunner

(57) ABSTRACT

A control system for estimating the performance of a compressor is disclosed. The control system has a compressor fluidly connected to an inlet manifold of a power source. The control system also has a power source speed sensor to provide an indication of a rotational speed of the power source, an inlet pressure sensor to provide an indication of a pressure of a fluid within the inlet manifold, an inlet temperature sensor to provide an indication of a temperature of the fluid within the inlet manifold, an atmospheric pressure sensor to provide an indication of an atmospheric pressure, and a control module in communication with each of the sensors. The control module is configured to monitor an engine valve opening duration and an exhaust gas recirculation valve position, and estimate a compressor inlet pressure based on the provided indications, the monitored duration, and the monitored position.

21 Claims, 2 Drawing Sheets

U.S. PATENT DOCUMENTS

| | | |
|---|---|---|
| 6,698,203 B2 | 3/2004 | Wang |
| 6,725,847 B2 * | 4/2004 | Brunemann et al. ... 123/568.12 |
| 6,732,522 B2 | 5/2004 | Wright et al. |
| 6,785,604 B2 | 8/2004 | Jacobson |
| 6,851,256 B2 | 2/2005 | Chamoto et al. |
| 6,934,621 B2 | 8/2005 | Bhargava et al. |
| 6,954,693 B2 * | 10/2005 | Brackney et al. ........... 701/109 |
| 2002/0124828 A1 * | 9/2002 | Shirakawa .................. 123/299 |
| 2004/0016419 A1 | 1/2004 | Satou et al. |
| 2005/0172628 A1 | 8/2005 | Fukasawa et al. |

FOREIGN PATENT DOCUMENTS

| | | |
|---|---|---|
| JP | 2004211551 | 7/2004 |
| JP | 2005061283 | 3/2005 |
| WO | WO 01/29386 | 4/2001 |
| WO | WO 03/046356 | 6/2003 |

* cited by examiner

CONTROL SYSTEM AND METHOD FOR ESTIMATING TURBOCHARGER PERFORMANCE

TECHNICAL FIELD

The present disclosure is directed to a turbocharger control system and, more particularly, to a control system and method for estimating the performance of a turbocharger.

BACKGROUND

Internal combustion engines such as, for example, diesel engines, gasoline engines, and gaseous fuel powered engines are supplied with a mixture of air and fuel for subsequent combustion within the engine that generates a mechanical power output. In order to maximize the power generated by this combustion process and reduce levels of resultant pollutants, the engine is often equipped with a turbocharged air induction system that implements exhaust gas recirculation (EGR).

A turbocharged air induction system includes a turbocharger that uses exhaust from the engine to compress air flowing into the engine, thereby forcing more air into a combustion chamber of the engine than the engine could otherwise draw into the combustion chamber. This increased supply of air allows for increased fueling, resulting in an increased power output. A turbocharged engine typically produces more power than the same engine without turbocharging.

EGR systems recirculate exhaust gas by-products into the intake air supply of the internal combustion engine. The exhaust gas, which is redirected to the combustion chamber of the engine, reduces the concentration of oxygen therein, thereby lowering the maximum combustion temperature. The lowered maximum combustion temperature slows the chemical reaction of the combustion process, thereby decreasing the formation of nitrous oxides. In addition, the particulate matter entrained in the exhaust is burned upon reintroduction into the engine combustion chamber to further reduce the exhaust gas by-products.

Control of the EGR system is often dependent on performance of the turbocharger. In particular, in order to provide the correct flow ratio of exhaust gas to intake air that results in compliance with emission regulations while maintaining temperatures with the induction system that provide for extended component life of the internal combustion engine, it may be important to continuously monitor, estimate, or otherwise calculate operational characteristics of the turbocharger during operation of the turbocharger. One method of estimating a turbocharger's performance is described in U.S. Pat. No. 6,401,457 (the '457 patent) issued to Wang et al. on Jun. 11, 2002. The '457 patent describes a system and method for estimating a compressor's efficiency and outlet temperature. The system of the '457 patent includes a compressor inlet temperature sensor, a compressor inlet pressure sensor, a fresh mass air flow sensor, a turbo speed sensor, an intake manifold pressure sensor, an EGR differential pressure sensor, an EGR valve position sensor, an exhaust pressure sensor, and an intake manifold temperature sensor. The method includes estimating the volumetric efficiency of the compressor based on a measured engine speed, measured intake manifold temperature, measured intake manifold temperature pressure, and measured exhaust pressure. The method then includes estimating a charge flow value as a function of the estimated volumetric efficiency, the measured engine speed, and the measured intake manifold temperature and pressure. A map is then used to select EGR mass flow based on a measured pressure differential and the measured inlet manifold pressure. A mass flow value is estimated based on the estimated charge flow value and the estimated EGR mass flow. A corrected mass flow value is calculated as a function of the mass flow value and the measured compressor inlet temperature and pressure. A corrected turbo speed is calculated as a function of the measured turbo speed and the compressor inlet temperature. A compressor pressure ratio is calculated as a function of the corrected mass flow value and the corrected turbo speed. The outlet temperature of the compressor is estimated based on the measured compressor inlet temperature, the estimated volumetric efficiency, and the calculated compressor pressure ratio. Alternatively, a compressor temperature ratio may be calculated based on the measured compressor inlet temperature, corrected mass flow value, and the corrected turbo speed; based on the measured compressor inlet temperature, corrected turbo speed, and calculated compressor pressure ratio; or based on the measured compressor inlet temperature, the calculated compressor ratio, and the corrected mass flow value.

Although the system of the '457 patent may provide ways to sufficiently estimate the pressure ratio, efficiency, and outlet temperature of a compressor, it may be expensive and unreliable. In particular, because of the number of sensory inputs, the cost of system may be substantial. In addition, because the outputs of the system rely on the large number of sensory inputs, a failure of one of the sensory inputs could produce unreliable estimations.

The control system of the present disclosure solves one or more of the problems set forth above.

SUMMARY OF THE INVENTION

One aspect of the present disclosure is directed to a control system for estimating performance of a compressor. The control system includes a compressor fluidly connected to an inlet manifold of a power source and being configured to receive a mixed flow of air and exhaust. The control system also includes a power source speed sensor associated with an output of the power source and being configured to provide an indication of a rotational speed of the power source, an inlet pressure sensor associated with the inlet manifold and being configured to provide an indication of a pressure of a fluid within the inlet manifold, an inlet temperature sensor associated with the inlet manifold of the power source and being configured to provide an indication of a temperature of the fluid within the inlet manifold, and an atmospheric pressure sensor configured to provide an indication of an atmospheric pressure. The control system further includes a control module in communication with the power source speed sensor, inlet pressure sensor, inlet temperature sensor, and atmospheric pressure sensor. The control module is configured to monitor an engine valve opening duration and an exhaust gas recirculation valve position. The control module is further configured to estimate a compressor inlet pressure based on the provided indications, the monitored engine valve opening duration, and the monitored exhaust gas recirculation valve position.

In another aspect, the present disclosure is directed to a method of estimating performance of a compressor. The method includes receiving an indication of a rotational speed of the power source, receiving an indication of a pressure of a fluid within the inlet manifold, and receiving an indication of a temperature of the fluid within the inlet manifold. The method also includes receiving an indication of an atmospheric pressure, receiving an indication of an engine valve opening duration, and receiving an indication of an exhaust gas recirculation valve position. The method further includes estimating a compressor inlet pressure based on the received indications.

DETAILED DESCRIPTION

Figure 1:
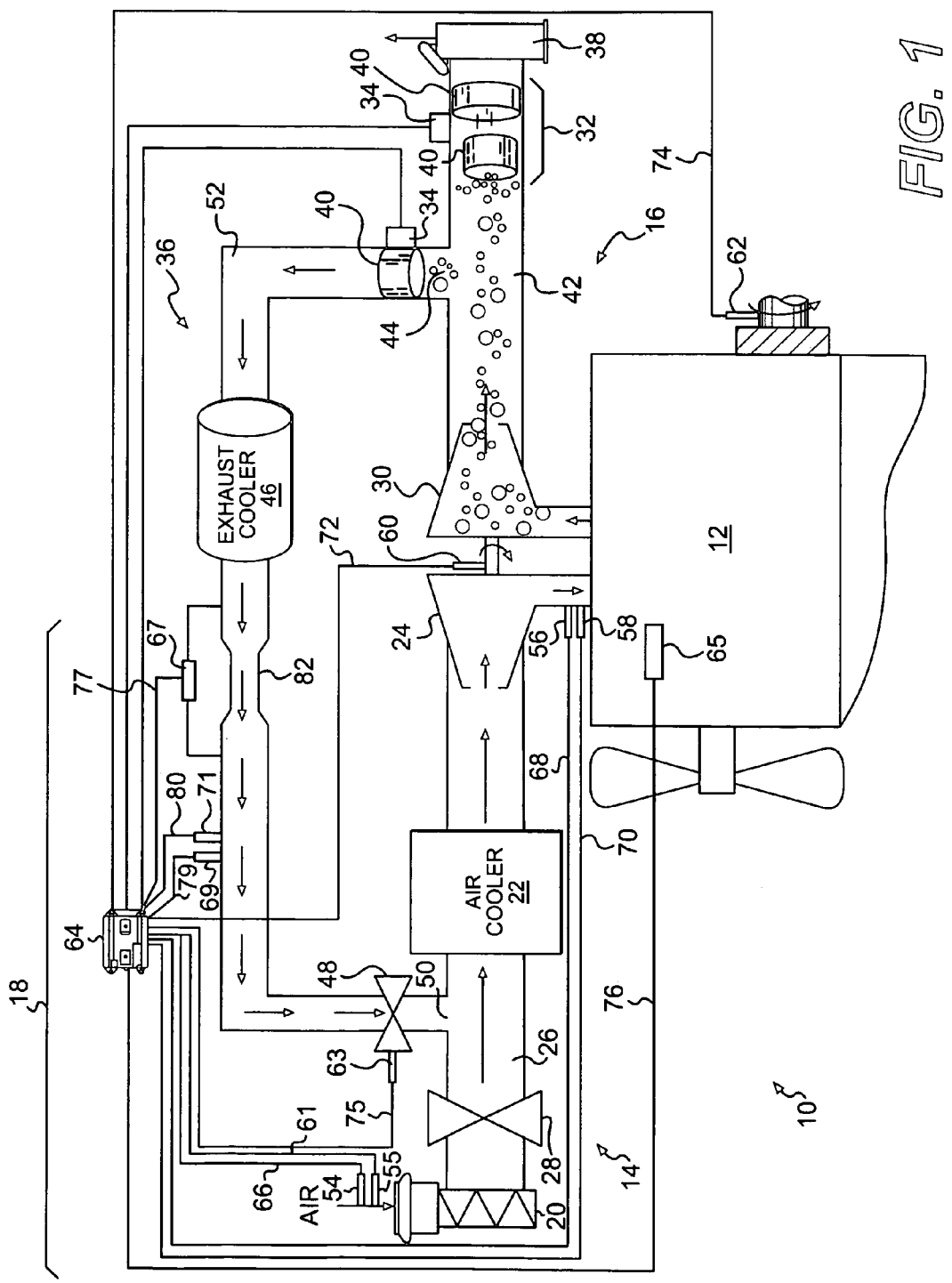
FIG. 1 is a diagrammatic illustration of an exemplary disclosed machine.
Figure 2:
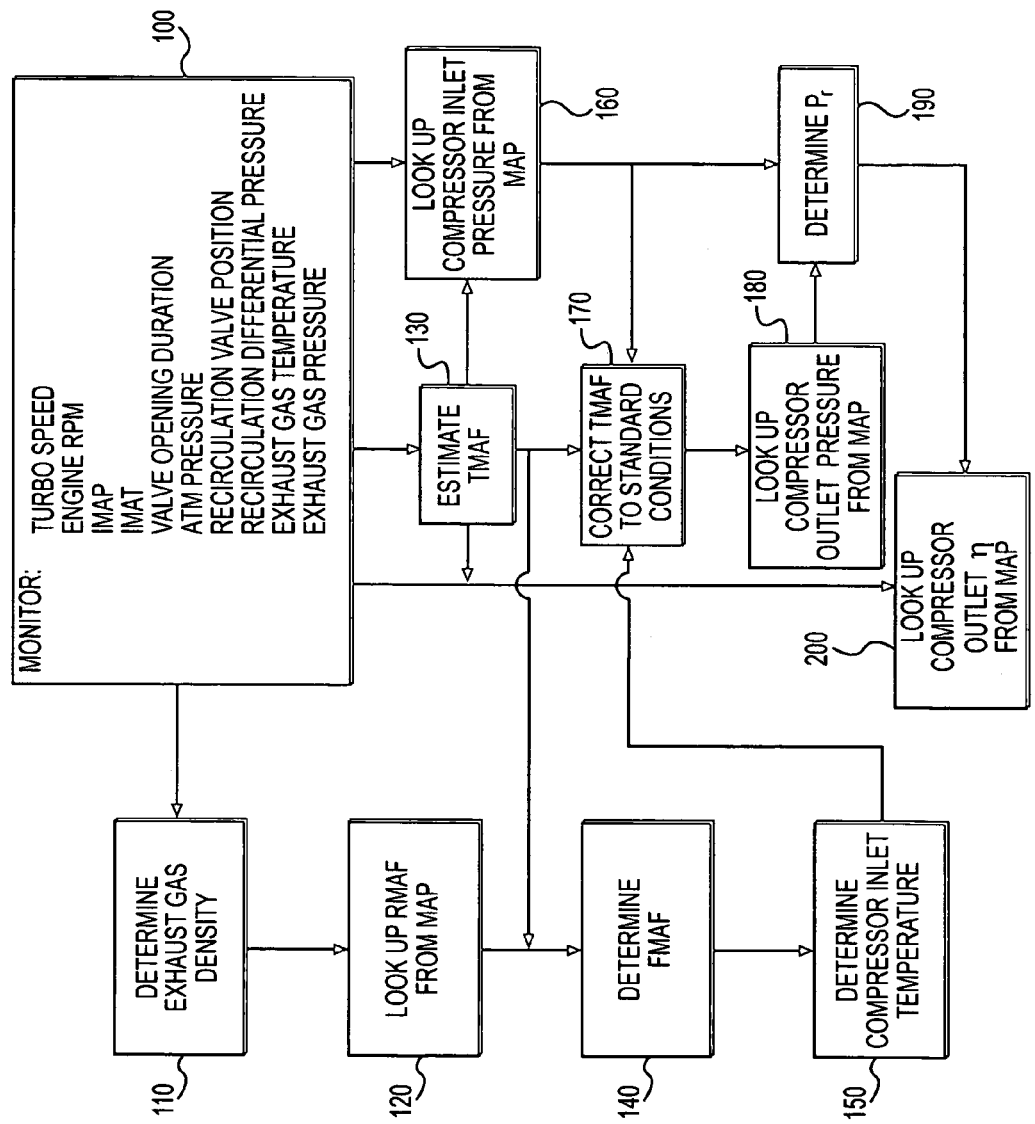
FIG. 2 is a flow chart depicting an exemplary disclosed method of estimating the performance of a compressor associated with the machine of FIG. 1.

FIG. 1 illustrates an exemplary machine 10 having multiple systems and components that cooperate to accomplish a task. Machine 10 may perform some type of operation associated with an industry such as mining, construction, farming, transportation, power generation, or any other industry known in the art. For example, machine 10 may embody a mobile machine such as an on-highway vocational vehicle, an off-highway haul truck, an excavator, a dozer, a loader, a motor grader, or any other load moving machine. Machine 10 may alternatively embody a stationary machine such as a generator set, a furnace, or another suitable stationary machine. Machine 10 may include a power source 12, an air induction system 14, an exhaust treatment system 16, and a control system 18.

Power source 12 may include a combustion engine having multiple subsystems that interact to produce mechanical and/or electrical power output and a flow of exhaust gas. For the purposes of this disclosure, power source 12 is depicted and described as a four-stroke diesel engine. One skilled in the art will recognize, however, that power source 12 may be any other type of combustion engine such as, for example, a gasoline or a gaseous fuel-powered engine. It is contemplated that power source 12 may include multiple subsystems such as, for example, a fuel system, a lubrication system, a cooling system, a drive system, a guidance system, or any other appropriate system.

Air induction system 14 may include components that condition and introduce compressed air into a combustion chamber (not shown) of power source 12. For example, air induction system 14 may include an air filter 20, an air cooler 22, and a compressor 24. It is contemplated that air induction system 14 may include different or additional components than described above such as, for example, inlet bypass components, and other known components.

Air filter 20 may be configured to remove or trap debris from air flowing into power source 12. For example, air filter 20 may include a full-flow filter, a self-cleaning filter, a centrifuge filter, an electro-static precipitator, or any other type of air filtering device known in the art. It is contemplated that more than one air filter 20 may be included within air induction system 14 and disposed in a series or parallel arrangement, if desired. Air filter 20 may be connected to power source 12 via fluid passageway 26.

Air cooler 22 may embody an air-to-air heat exchanger or an air-to-liquid heat exchanger disposed within fluid passageway 26 and configured to facilitate the transfer of heat to or from the air directed into power source 12. For example, air cooler 22 may include a tube and shell type heat exchanger, a plate type heat exchanger, a tube and fin type heat exchanger, or any other type of heat exchanger known in the art. By cooling the air directed into power source 12, a greater amount of air may be drawn into power source 12 during any one combustion cycle. The flow of air directed through air cooler 22 may be regulated by an induction valve 28 such that a desired flow rate, pressure, and/or temperature at the inlet of power source 12 may be achieved.

Compressor 24 may also be disposed within fluid passageway 26 downstream of air filter 20 to compress the air flowing into power source 12. Compressor 24 may embody a fixed geometry type compressor, a variable geometry type compressor, or any other type of compressor known in the art. It is contemplated that more than one compressor 24 may be included within air induction system 14 and disposed in parallel or in series relationship, if desired.

Exhaust treatment system 16 may include a means for treating and directing the flow of exhaust gases from power source 12 to the atmosphere. For example, exhaust treatment system 16 may include a turbine 30 connected to receive exhaust from power source 12, a particulate trap 32 disposed downstream of turbine 30, a regeneration device 34 associated therewith, an exhaust gas recirculation subsystem 36, and an exhaust stack 38. It is contemplated that exhaust treatment system 16 may include additional and/or different components such as, for example, SCR devices, NOx absorbers or other catalytic devices; attenuation devices; and other means known in the art for directing exhaust flow from power source 12 and/or for treating the flow of exhaust.

Turbine 30 may be connected to drive compressor 24. In particular, as hot exhaust gases from power source 12 expand against blades (not shown) of turbine 30, turbine 30 may rotate a common shaft to drive compressor 24. It is contemplated that more than one turbine 30 may alternatively be included within exhaust treatment system 16 and disposed in a parallel or series relationship, if desired. It is also contemplated that turbine 30 may be omitted and compressor 24 driven directly by power source 12 mechanically, hydraulically, electrically, or in any other manner known in the art, if desired.

Particulate trap 32 may include one or more filtering elements 40 connected to turbine 30 by way of fluid passageway 42 and configured to remove particulate matter from the exhaust flow. Specifically, filtering elements 40 may embody deep bed ceramic-type elements configured to accumulate particulate matter throughout a thickness of the element, shallow bed type elements such as impingement type metallic or ceramic meshes configured to accumulate particulate matter at a surface of the element, or any other suitable type of filtering element know in the art. The size of the pore and/or mesh openings of filtering elements 40 may vary and be selected depending on a particular application. It is contemplated that filtering elements 40 may include pleats to increase a filtration area, may be catalyzed to reduce an oxidation temperature of entrapped particulate matter, may include an electrostatic device for increased trapping efficiency, and/or may be electrically conductive to facilitate a regeneration process, if desired.

Regeneration device 34 may include components configured to regenerate particulate trap 32. Specifically, regeneration device 34 may include a fuel or electrically powered burner, an air blocking device, an air supply mechanism, a catalyst injection device, an engine valve timing controller, or any other appropriate type of device configured to raise the temperature of particulate matter entrapped within filtering elements 40 to a combustion initiation threshold temperature. Regeneration device 34 may be controlled to initiate regeneration of filtering elements 40 in response to one or more input such as, for example, an elapsed time period, an exhaust temperature, a pressure differential across filtering elements 40, an exhaust back pressure, or any other suitable condition.

Exhaust gas recirculation subsystem 36 may include a means for redirecting a portion of the exhaust flow of power source 12 from turbine 30 into air induction system 14. For example, exhaust gas recirculation subsystem 36 may include an inlet port 44, an exhaust cooler 46, a recirculation valve 48, and a discharge port 50. It is contemplated that exhaust gas recirculation subsystem 36 may include additional or different components such as a catalyst, an electrostatic precipitation device, a shield gas system, and other means for redirecting exhaust that are known in the art Inlet port 44 may be connected to fluid passageway 42 downstream of turbine 30, and configured to receive at least a portion of the exhaust flow from power source 12. Specifically, inlet port 44 may redirect low pressure exhaust to exhaust cooler 46 by way of a fluid passageway 52. It is contemplated that inlet port 44 may alternatively be in communication with fluid passageway 42 upstream of turbine 30, if desired, to redirect high pressure exhaust to exhaust cooler 46.

Exhaust cooler 46 may be fluidly connected to cool the portion of the exhaust flowing through inlet port 44. Exhaust cooler 46 may include a liquid-to-air heat exchanger, an air-to-air heat exchanger, or any other type of heat exchanger known in the art for cooling an exhaust flow. For example, exhaust cooler 46 may include a tube and shell type heat exchanger, a plate type heat exchanger, a tube and fin type heat exchanger, or any other type of heat exchanger known in the art. By cooling the exhaust flow prior to communication with air induction system 14, the component life of air induction system 14 may be prolonged and efficiency of power source 12 improved. It is contemplated that exhaust cooler 46 may be omitted, if desired.

Recirculation valve 48 may be disposed within fluid passageway 52 and configured to regulate the flow of cooled exhaust through exhaust gas recirculation subsystem 36. Recirculation valve 48 may be a spool valve, a shutter valve, a butterfly valve, a check valve, or any other valve known in the art. Recirculation valve 48 may be solenoid-actuated, hydraulically-actuated, pneumatically-actuated, or actuated in any other suitable manner. It is contemplated that a flow characteristic of recirculation valve 48 may be inversely related to a flow characteristic of induction valve 28. For example, as the flow of exhaust through recirculation valve 48 increases, the flow of air through induction valve 28 may proportionally decrease. Likewise, as the flow of exhaust through recirculation valve 48 decreases, the flow of air through induction valve 28 may proportionally increase.

Discharge port 50 may be disposed within fluid passageway 52 downstream of recirculation valve 48 and configured to direct an exhaust flow into air induction system 14. Discharge port 50 may be connected to air induction system 14 upstream of compressor 24, such that compressor 24 may draw the exhaust flow from discharge port 50. In a high pressure recirculation system (e.g., where inlet port 44 is located upstream of turbine 30), discharge port 50 may alternatively be located downstream of compressor 24, if desired.

Control system 18 may include components that cooperate to monitor the operation of air induction system 14, exhaust gas recirculation subsystem 36, and power source 12. In particular, control system 18 may sense one or more operational characteristics of air induction system 14, exhaust gas recirculation subsystem 36, and power source 12 and, in response to the sensed operational characteristics, perform estimations and calculations for control of machine 10. For this purpose, control system 18 may include an ambient air pressure sensor 54, ambient air temperature sensor 55, an inlet manifold air pressure (IMAP) sensor 56, an inlet manifold air temperature (IMAT) sensor 58, a turbo speed sensor 60, a engine speed sensor 62, a recirculation valve position sensor 63, a variable engine valve position sensor 65, a recirculation pressure differential sensor 67, an exhaust gas pressure sensor 69, an exhaust gas temperature sensor 71, and an electronic control unit (ECU) 64. ECU 64 may be in communication with each of these sensors via communication lines 66, 61, 68, 70, 72, 74, 75, 76, 77, 79, and 80, respectively. It is contemplated that ECU 64 may be in communication with additional components and systems of machine 10 to receive other system-related input, if desired.

Ambient air pressure sensor 54 may be mounted to a member of machine 10 or power source 12, and configured to sense the ambient air pressure. In particular, ambient air pressure sensor 54 may embody a strain gauge-type sensor, a piezoresistive type pressure sensor, or any other type of pressure sensing device known in the art. Ambient air pressure sensor 54 may generate a signal indicative of the ambient air pressure and send this signal to ECU 64 via communication line 66. This signal may be sent continuously, on a periodic basis, or only when prompted by to do so by ECU 64.

Ambient air temperature sensor 55 may also be mounted to a member of machine 10 or power source 12, but configured to sense the temperature of fresh air flowing into induction system 14. For example, ambient air temperature sensor 55 may be a surface-temperature-type sensor that measures a wall temperature at an entry point of air induction system 14, an air temperature-type sensor that directly measure the temperature of the ambient air, or any other type of sensor known in the art. Ambient air temperature sensor 55 may generate an ambient air temperature signal and send this signal to ECU 64 via communication line 61. This ambient air temperature signal may be sent continuously, on a periodic basis, or only when prompted by ECU 64

IMAP sensor 56 may be mounted at least partially within fluid passageway 26 at an inlet of power source 12, and configured to sense the absolute pressure of air entering the combustion chambers of power source 12. Similar to ambient air pressure sensor 54, IMAP sensor 56 may embody a strain gauge-type sensor, a piezoresistive type pressure sensor, or any other type of pressure sensing device known in the art. IMAP sensor 56 may generate an absolute pressure signal and send this signal to ECU 64 via communication line 68. This IMAP signal may be sent continuously, on a periodic basis, or only when prompted by ECU 64

Similar to IMAP sensor 56, IMAT sensor 58 may also be mounted at least partially within fluid passageway 26 at an inlet of power source 12, but configured to sense the temperature of air entering the combustion chambers of power source 12. For example, IMAT sensor 58 may be a surface-temperature-type sensor that measures a wall temperature at the point where the air exits compressor 24, an air temperature-type sensor that directly measure the temperature of the air exiting compressor 24, or any other type of sensor known in the art. IMAT sensor 58 may generate an air temperature signal and send this signal to ECU 64 via communication line 70. This IMAT signal may be sent continuously, on a periodic basis, or only when prompted by ECU 64

Turbo speed sensor 60 may sense a speed of compressor 24. For example, turbo speed sensor 60 may embody a magnetic pickup sensor configured to sense a rotational speed of the common turbocharger shaft and produce a corresponding speed signal. For example, turbo speed sensor 60 may be disposed proximal a magnetic element (not shown) embedded within the turbocharger shaft to produce a signal corresponding to the resulting rotating magnetic field. The speed signal may be sent to ECU 64 by way of communication line 72.

Similar to turbo speed sensor 60, engine speed sensor 62 may also sense a rotational speed, but of power source 12 rather than compressor 24. For example, engine speed sensor 62 may embody a magnetic pickup sensor configured to sense a rotational speed of a power source crankshaft and produce a corresponding speed signal. Engine speed sensor 62 may be disposed proximal a magnetic element (not shown) embedded within the crankshaft, proximal a magnetic element (not shown) embedded within a component directly or indirectly driven by the crankshaft, or disposed in other suitable manner to produce a signal corresponding to the rotational speed of the resulting magnetic field. The power source speed signal may be sent to ECU 64 by way of communication line 74.

Recirculation valve position sensor 63 may embody a magnetic pickup type sensor associated with a magnet (not shown) embedded within a movable element of recirculation valve 48. As recirculation valve 48 is actuated, recirculation valve position sensor 63 may provide to ECU 64 an indication of the position of the valve element. It is contemplated that recirculation valve position sensor 63 may be omitted and ECU 64 alternatively be in direct communication with recirculation valve 48 to monitor a positional command signal sent to recirculation valve 48.

Variable engine valve position sensor 65 may be associated with an intake valve (not shown) of power source 12 to generate a signal indicative of an opening duration and/or amount of the intake valve. Variable engine valve position sensor 65 may be any type of engine valve position sensor known in the art such as, for example, a piezo crystal position sensor. A piezo crystal position sensor includes a piezo crystal that exerts a voltage proportional to the compression of the crystal resulting from engine valve movement. It is contemplated that variable engine valve position sensor 65 may be omitted and ECU 64 alternatively be in direct communication with a variable valve actuation device (not shown) to monitor a valve opening command provided to the variable valve actuation device, if desired.

Recirculation differential pressure sensor 67 may be mounted to a member of machine 10 or power source 12, and configured to sense the difference in the pressures of fluid entering and exiting a venturi 82 within fluid passageway 52. In particular, recirculation differential pressure sensor 67 may embody a strain gauge-type sensor having two separate pressure ports. Recirculation differential pressure sensor 67 may generate a signal indicative of the exhaust gas pressure difference between the two ports and send this signal to ECU 64 via communication line 77. This signal may be sent continuously, on a periodic basis, or only when prompted by to do so by ECU 64. It is contemplated that venturi 82 may be omitted, if desired. It is contemplated that instead of using recirculation differential pressure sensor 67 other devices such as, for example, a hot wire anemometer may be used to generate signals indicative of pressure, velocity, and/or flow rate of the exhaust gas passing through fluid passageway 52, if desired.

Exhaust gas pressure sensor 69 may be mounted at least partially within fluid passageway 52 to sense the absolute pressure of exhaust gases flowing therethrough. In particular, exhaust gas pressure sensor 69 may embody a strain gauge-type sensor, a piezoresistive type pressure sensor, or any other type of pressure sensing device known in the art. Exhaust gas pressure sensor 69 may generate a signal indicative of the exhaust gas pressure within fluid passageway 52 and send this signal to ECU 64 via communication line 79. This signal may be sent continuously, on a periodic basis, or only when prompted by to do so by ECU 64.

Exhaust gas temperature sensor 71 may be mounted at least partially within fluid passageway 52 between the exit of exhaust cooler 46 and discharge port 50 to sense the temperature of a recirculation air flow directed to induction system 14. For example, exhaust gas temperature sensor 71 may embody a surface-temperature-type sensor that measures a wall temperature of fluid passageway 52, an air-temperature-type sensor that directly measure the temperature of the exhaust within fluid passageway 52, or any other type of sensor known in the art. Exhaust gas temperature sensor 71 may generate an exhaust temperature signal and send this signal to ECU 64 via communication line 80. This temperature signal may be sent continuously, on a periodic basis, or only when prompted by ECU 64.

ECU 64 may embody a single microprocessor or multiple interconnected microprocessors that include a means for controlling an operation of control system 18. Numerous commercially available microprocessors can be configured to perform the functions of ECU 64. It should be appreciated that ECU 64 could readily embody a general machine microprocessor capable of controlling numerous machine and/or power source functions. ECU 64 may include a memory, a secondary storage device, a processor, and any other components for running an application. Various other circuits may be associated with ECU 64 such as power supply circuitry, signal conditioning circuitry, solenoid driver circuitry, and other types of circuitry.

ECU 64 may estimate compressor efficiency, inlet temperature, outlet temperature, and other associated operational characteristics based on the signals received from sensors 54, 56, 58, 60, 62, 63, 65, 67, 69, and 71. Specifically, a plurality of relationship maps may be stored in the memory of ECU 64. Each of these maps may include a collection of data in the form of tables, graphs, and/or equations. For example, an exhaust differential pressure value and an exhaust gas density value may form the coordinate axis of a 3-D map used for determining a Recirculation Mass Air Flow (RMAF) value. In another example, the sensed atmospheric pressure value, the recirculation valve position, and a calculated total mass air flow (TMAF) value may form the coordinate axis of a 4-D map used for determining a compressor inlet pressure. In yet another example, a corrected TMAF value and a sensed inlet manifold air pressure value may form the coordinate axis of a 3-D map used for determining a compressor outlet pressure. In an additional example, a calculated compressor pressure ratio value, a sensed turbo speed value, and the corrected TMAF value may form the coordinate axis of a 4-D map used for determining a compressor efficiency. It is contemplated that additional and/or different maps could be stored within ECU 64, if desired.

FIG. 3 illustrates an exemplary method of estimating compressor operational characteristics utilizing the maps described above. FIG. 3 will be discussed in the following section to further illustrate the disclosed system and its operation.

INDUSTRIAL APPLICABILITY

The disclosed control system may be applicable to any charged air internal combustion engine that implements EGR where accurate knowledge of compressor characteristics are important. In particular, the disclosed control system may provide a simple, low cost, and efficient way to estimate compressor efficiency, inlet temperature, outlet temperature, and other characteristics for use in controlling associated induction and exhaust recirculation systems. The operation of control system 18 will now be explained.

As illustrated in FIG. 3, the first steps of estimating the efficiency of compressor 24 may include ECU 64 receiving input from the various systems of machine 10. Specifically, ECU 64 may receive a turbo speed input; an engine RPM input, an IMAP input, an IMAT input, a engine valve opening duration input, an ATM pressure input, a recirculation valve position input, a recirculation differential pressure input, an exhaust gas temperature input, and an exhaust gas pressure input (Step 100) by way of communication lines 66, 68, 70, and 72-80.

In response to the received input, ECU 64 may determine a density of the exhaust gas directed to air induction system 14 (Step 110). Specifically, ECU 64 may use Eq. 1 below to calculate the exhaust gas density as a function of the exhaust gas pressure and temperature values obtained via sensors 69 and 71.

$$\rho_{Exh} = \frac{P_{Exh}}{R*(T_{Exh}+273.15)} \qquad \text{Eq. 1}$$

wherein:
$\rho_{Exh}$ is the Density of the Exhaust;
R is the Universal Gas Constant (0.2872);
$P_{Exh}$ is the Pressure of the Exhaust; and
$T_{Exh}$ is the Temperature of the Exhaust.

ECU 64 may then reference one of the 3-D maps stored within the memory thereof to determine the RMAF (Step 120). In particular, ECU 64 may compare the exhaust gas differential pressure value obtained via sensor 67 and the exhaust gas density value calculated from Eq. 1 above to determine the RMAF value.

Simultaneous to steps 110 and/or 120, ECU 64 may also estimate the TMAF (Step 130). Specifically, as described in Eq. 2 below, TMAF may be calculated as a function of the duration of the intake valve opening value received from sensor 65, engine RPM obtained from sensor 62, and the ratio of the IMAP value to the IMAT value received via sensors 56 and 58, respectively.

$$TMAF = \text{Duration}_{IV}^{A} \times \left[(B \times RPM_{Engine}) \times \frac{IMAP^{C}}{IMAT^{D}}\right] \qquad \text{Eq. 2}$$

wherein:
TMAF is the Total Mass Air Flow;
$\text{Duration}_{IV}$ is an Opening Duration of an intake valve;
$RPM_{Engine}$ is the rotational speed of power source 12;
IMAP is the sensed Inlet Manifold Air Pressure;
IMAT is the sensed Inlet Manifold Air Temperature; and
A, B, C, and D are variables determined through analysis and/or operational testing.

Once TMAF and RMAF have been calculated, a Fresh Mass Air Flow (FMAF) value may be calculated (Step 140). FMAF may be calculated as the difference between TMAF and RMAF according to Eq. 3 below.

$$FMAF = TMAF - RMAF \qquad \text{Eq. 3}$$

wherein:
FMAF is the Fresh Mass Air Flow;
TMAF is the Total Mass Air Flow; and
RMAF is the Recirculation Mass Air Flow.

Following the calculation of the FMAF value, a compressor inlet temperature may be determined (Step 150). In particular, compressor inlet temperature may be calculated according to Eq. 4 below.

$$T_{\text{Comp\_In}} = \frac{FMAF \times T_{FMAF} + RMAF \times T_{RMAF}}{FMAF + RMAF} \qquad \text{Eq. 4}$$

wherein:
$T_{Comp\_In}$ is the Compressor Inlet Temperature;
FMAF is the Fresh Mass Air Flow;
$T_{FMAF}$ is the Temperature of the Fresh Mass Air Flow;
RMAF is the Recirculated Mass Air Flow; and
$T_{FMAF}$ is the Temperature of the Recirculated Mass Air Flow.

Also following the calculation of the TMAF value, a compressor inlet pressure may be determined (Step 160). In particular, ECU 64 may reference one of the 4-D maps stored within the memory thereof and compare the atmospheric pressure value obtained via sensor 54, the TMAF value, and the recirculation valve position to determine the compressor inlet pressure value. It is contemplated that compressor inlet pressure may alternatively or additionally be determined based on the density of the air flowing through compressor 24, if desired. Atmospheric air density may be estimated based on FMAF, atmospheric pressure, recirculation valve position, and TMAF.

Once the compressor inlet pressure value has been determined, the TMAF value may be corrected to standard conditions according to Eq. 5 below (Step 170)

$$TMAF_{corr} = TMAF \times \frac{\sqrt{\frac{T_{\text{Comp\_In}}}{T_{STD}}}}{\frac{P_{\text{Comp\_In}}}{P_{STD}}} \qquad \text{Eq. 5}$$

wherein:
$TMAF_{corr}$ is the Corrected Total Mass Air Flow;
TMAF is the Total Mass Air Flow;
$T_{Comp\_In}$ is the Compressor Inlet Temperature;
$T_{STD}$ is the Standard Air Temperature (25° C.);
$P_{Comp\_In}$ is the Compressor Inlet Pressure; and
$P_{STD}$ is the Standard Air Pressure (101.325 kPa).

ECU 64 may then reference one of the 3-D maps stored within the memory thereof to determine the compressor outlet pressure (Step 180). In particular, ECU 64 may compare the corrected TMAF value and the IMAP value obtained via sensor 58 with the appropriate map to determine the compressor outlet pressure value.

Following the completion of steps 160 and 180, ECU 64 may determine the pressure ratio of fluid entering compressor 24 to the fluid exiting compressor 24 (Step 190). That is, ECU 64 may calculate the pressure ratio according to FIG. 6 below.

$$P_r = \frac{P_{Comp\_out}}{P_{Comp\_in}} \qquad \text{Eq. 6}$$

wherein:
$P_r$ is the Pressure Ratio;
$P_{Comp\_out}$ is the Compressor Outlet Pressure; and
$P_{Comp\_In}$ is the Compressor Inlet Pressure.

ECU 64 may then reference one of the 4-D maps stored within the memory thereof to determine the compressor efficiency in a number of different ways (Step 200). First, ECU 64 may compare the corrected TMAF value and the compressor pressure ratio value with the appropriate map to determine compressor efficiency. Second, ECU 64 may compare the corrected TMAF value and the turbo speed value obtained via sensor 60 with the same map to determine compressor efficiency. Third, ECU 64 may compare the turbo speed value and the compressor pressure ratio value with the same map to determine compressor efficiency. The way in which ECU 64 determines the compressor efficiency value may depend on operating conditions of machine 10.

Many advantages may be associated with the disclosed control system over the prior art. In particular, because the disclosed control system may determine compressor inlet temperature, outlet temperature, and efficiency with fewer sensory inputs, the cost of the disclosed system may be lower when compared to the prior art. In addition, because calculation of these compressor operating characteristics may rely on a lower number of sensory inputs, the disclosed system may be more robust.

It will be apparent to those skilled in the art that various modifications and variations can be made to the disclosed control system. Other embodiments will be apparent to those skilled in the art from consideration of the specification and practice of the disclosed control system. It is intended that the specification and examples be considered as exemplary only, with a true scope being indicated by the following claims and their equivalents.

What is claimed is:

1. A control system for estimating performance of a compressor, comprising:
a compressor fluidly connected to an inlet manifold of a power source and being configured to receive a mixed flow of air and exhaust;
a power source speed sensor associated with an output of the power source and being configured to provide an indication of a rotational speed of the power source;
an inlet pressure sensor associated with the inlet manifold and being configured to provide an indication of a pressure of a fluid within the inlet manifold;
an inlet temperature sensor associated with the inlet manifold of the power source and being configured to provide an indication of a temperature of the fluid within the inlet manifold;
an atmospheric pressure sensor configured to provide an indication of an atmospheric pressure; and
a control module in communication with the power source speed sensor, inlet pressure sensor, inlet temperature sensor, and atmospheric pressure sensor, the control module being configured to:
monitor:
an engine valve opening duration; and
an exhaust gas recirculation valve position; and
estimate a compressor inlet pressure based on the provided indications, the monitored engine valve opening duration, and the monitored exhaust gas recirculation valve position.

2. The control system of claim 1, further including:
an exhaust gas pressure sensor configured to provide an indication of an exhaust gas pressure; and
an exhaust gas temperature sensor configured to provide an indication of an exhaust gas temperature, wherein the control module is further configured to determine an exhaust gas density based on the provided indications of exhaust gas pressure and temperature.

3. The control system of claim 2, further including an exhaust gas differential pressure sensor configured to provide an indication of an exhaust gas differential pressure associated with an exhaust venturi, wherein the control module is further configured estimate an exhaust gas recirculation mass air flow value based on the provided indication of exhaust gas differential pressure and the determined exhaust gas density.

4. The control system of claim 3, further including an atmospheric temperature sensor configured to provide an indication of an atmospheric temperature, wherein the control module is further configured to:
estimate a total mass air flow of fluid through the compressor based on:
the monitored engine valve opening duration;
the provided indication of a rotational speed of the power source;
the provided indication of a pressure of a fluid within the inlet manifold; and
the provided indication of a temperature of the fluid within the inlet manifold; and
estimate a compressor inlet temperature based on:
the estimated total mass air flow;
the provided indication of an atmospheric temperature;
the estimated exhaust gas recirculation mass air flow; and
the provided indication of an exhaust gas temperature.

5. The control system of claim 4, wherein the control module is further configured to estimate a compressor outlet pressure based on:
the estimated total mass air flow; and
the provided indication of a pressure of a fluid within the inlet manifold.

6. The control system of claim 5, wherein the control module is further configured to estimate a compressor efficiency based on:
the estimated total mass air flow;
the estimated compressor outlet pressure; and
the estimated compressor inlet pressure.

7. The control system of claim 5, further including a compressor speed sensor configured to provide an indication of a rotational speed of the compressor, wherein the control module is further configured to estimate a compressor efficiency based on:
the estimated compressor outlet pressure;
the estimated compressor inlet pressure; and
the provided indication of a rotational speed of the compressor.

8. The control system of claim 4, further including a compressor speed sensor configured to provide an indication of a rotational speed of the compressor, wherein the control module is further configured to estimate a compressor efficiency based on:
the estimated total mass air flow; and
the provided indication of a rotational speed of the compressor.

9. A method of estimating performance of a compressor, comprising:
receiving an indication of a rotational speed of the power source;
receiving an indication of a pressure of a fluid within the inlet manifold;
receiving an indication of a temperature of the fluid within the inlet manifold;
receiving an indication of an atmospheric pressure;
receiving an indication of an engine valve opening duration;
receiving an indication of an exhaust gas recirculation valve position; and
estimating a compressor inlet pressure based on the received indications.

10. The method of claim 9, further including:
receiving an indication of an exhaust gas pressure;
receiving an indication of an exhaust gas temperature; and
determining an exhaust gas density based on the received indications of exhaust gas pressure and temperature.

11. The method of claim 10, further including:
receiving an indication of an exhaust gas differential pressure associated with an exhaust venturi; and
estimating an exhaust gas recirculation mass air flow value based on the received indication of exhaust gas differential pressure and the determined exhaust gas density.

12. The method of claim 11, further including:
receiving an indication of an atmospheric temperature;
estimating a total mass air flow of fluid through the compressor based on:
the received indication of an engine valve opening duration;
the received indication of a rotational speed of the power source;
the received indication of a pressure of a fluid within the inlet manifold; and
the provided indication of a temperature of the fluid within the inlet manifold; and
estimating a compressor inlet temperature based on:
the estimated total mass air flow;
the received indication of an atmospheric temperature;
the estimated exhaust gas recirculation mass air flow; and
the received indication of an exhaust gas temperature.

13. The method of claim 12, further including estimating a compressor outlet pressure based on:
the total mass air flow; and
the received indication of a pressure of a fluid within the inlet manifold.

14. The method of claim 13, further including estimating a compressor efficiency based on:
the estimated total mass air flow;
the estimated compressor outlet pressure; and
the estimated compressor inlet pressure.

15. The method of claim 13, further including:
receiving an indication of a rotational speed of the compressor; and
estimating a compressor efficiency based on:
the estimated compressor outlet pressure;
the estimated compressor inlet pressure; and
the received indication of a rotational speed of the compressor.

16. The method of claim 12, further including:
receiving an indication of a rotational speed of the compressor; and
estimating a compressor efficiency based on:
the estimated total mass air flow; and
the received indication of a rotational speed of the compressor.

17. A machine, comprising:
an engine having variable engine valve timing and an inlet manifold;
an air induction system having a compressor configured to supply compressed air through the inlet manifold to the engine;
an exhaust recirculation system having a recirculation valve configured to meter exhaust gas to the compressor;
an engine speed sensor associated configured to provide an indication of a rotational speed of the engine;
an inlet manifold pressure sensor configured to provide an indication of a pressure of a fluid within the inlet manifold;
an inlet manifold temperature sensor configured to provide an indication of a temperature of the fluid within the inlet manifold;
an atmospheric pressure sensor configured to provide an indication of an atmospheric pressure; and
a control module in communication with the inlet manifold pressure, inlet manifold temperature, and atmospheric pressure sensors, the control module being configured to:
monitor:
an engine valve opening duration; and
a position of the recirculation valve; and
estimate a compressor inlet pressure based on the provided indications, monitored engine valve opening duration, and monitored recirculation valve position.

18. The machine of claim 17, further including:
an exhaust gas pressure sensor configured to provide an indication of an exhaust gas pressure;
an exhaust gas temperature sensor configured to provide an indication of an exhaust gas temperature; and
an exhaust gas differential pressure sensor configured to provide an indication of an exhaust gas differential pressure associated with an exhaust venturi, wherein the control module is further configured to:
determine an exhaust gas density based on the provided indications of exhaust gas pressure and temperature; and
estimate an exhaust gas recirculation mass air flow value based on the provided indication of exhaust gas differential pressure and the determined exhaust gas density.

19. The machine of claim 18, further including an atmospheric temperature sensor configured to provide an indication of an atmospheric temperature, wherein the control module is further configured to:
estimate a total mass air flow of fluid through the compressor based on:
the monitored engine valve opening duration;
the provided indication of a rotational speed of the power source;
the provided indication of a pressure of a fluid within the inlet manifold; and the provided indication of a temperature of the fluid within the inlet manifold; and estimate a compressor inlet temperature based on:
the estimated total mass air flow;
the provided indication of an atmospheric temperature;
the estimated exhaust gas recirculation mass air flow; and
the provided indication of an exhaust gas temperature.

20. The machine of claim 19, wherein the control module is further configured to:
estimate a compressor outlet pressure based on:
the total mass air flow; and
the indication of a pressure of a fluid within the inlet manifold; and
estimate a compressor efficiency based on:
the estimated total mass air flow;
the estimated compressor outlet pressure; and
the estimated compressor inlet pressure.

21. The machine of claim 20, further including a compressor speed sensor configured to provide an indication of a rotational speed of the compressor, wherein the control module is further configured to:
estimate a compressor efficiency based on:
the estimated compressor outlet pressure;
the estimated compressor inlet pressure; and
the provided indication of a rotational speed of the compressor; and
estimate a compressor efficiency based on:
the estimated total mass air flow; and
the provided indication of a rotational speed of the compressor.

* * * * *